(12) United States Patent
Feldman

(10) Patent No.: US 12,058,011 B2
(45) Date of Patent: Aug. 6, 2024

(54) SYSTEM AND METHOD FOR A REMOTE SESSION USER EXPERIENCE ANALYSIS

(71) Applicant: ControlUp Technologies Ltd., Rishon LeTsiyon (IL)

(72) Inventor: Gadi Feldman, Beit Hanania (IL)

(73) Assignee: ControlUp Technologies Ltd., Rishon LeTsiyon (IL)

( * ) Notice: Subject to any disclaimer, the term of this patent is extended or adjusted under 35 U.S.C. 154(b) by 10 days.

(21) Appl. No.: 17/341,429

(22) Filed: Jun. 8, 2021

(65) Prior Publication Data
US 2022/0393955 A1   Dec. 8, 2022

(51) Int. Cl.
*H04L 41/50*   (2022.01)

(52) U.S. Cl.
CPC ...... *H04L 41/5032* (2013.01); *H04L 41/5096* (2013.01)

(58) Field of Classification Search
CPC .................... H04L 41/5032; H04L 41/5096
See application file for complete search history.

(56) References Cited

U.S. PATENT DOCUMENTS

| | | | | |
|---|---|---|---|---|
| 8,555,274 | B1 * | 10/2013 | Chawla | G06F 9/45558 718/1 |
| 9,509,799 | B1 * | 11/2016 | Cronin | G06F 3/0484 |
| 2004/0177138 | A1 * | 9/2004 | Salle | H04L 67/306 715/205 |
| 2006/0218285 | A1 | 9/2006 | Talwar et al. | |
| 2010/0138534 | A1 | 6/2010 | Mutnuru et al. | |
| 2011/0047211 | A1 | 2/2011 | Makhija et al. | |
| 2011/0219112 | A1 * | 9/2011 | Fagg et al. | H04L 43/0811 709/224 |
| 2012/0078994 | A1 | 3/2012 | Jackowski et al. | |
| 2012/0311126 | A1 * | 12/2012 | Jadallah | H04N 21/238 709/224 |
| 2013/0054677 | A1 | 2/2013 | Ponsford et al. | |
| 2014/0344806 | A1 * | 11/2014 | Suresh | G06F 9/45533 718/1 |
| 2015/0016397 | A1 * | 1/2015 | Han | H04W 28/24 370/329 |
| 2015/0150007 | A1 | 5/2015 | Belkine et al. | |
| 2015/0319269 | A1 | 11/2015 | Jensen et al. | |
| 2015/0350003 | A1 * | 12/2015 | Anderson | H04L 63/08 709/221 |
| 2017/0026495 | A1 | 1/2017 | Gyorffy | |
| 2017/0054818 | A1 * | 2/2017 | Hassan | H04L 67/16 |

(Continued)

FOREIGN PATENT DOCUMENTS

WO   2013029821 A1   3/2013

*Primary Examiner* — Raqiul A Choudhury

(57) ABSTRACT

The presently disclosed subject matter aims to a system and method directed to provide a remote session user experience analysis. The system and method includes Remote Desktop Protocol (RDP) server comprising a processing circuitry configured to: obtain connection information from a Remote Desktop Protocol (RDP) client, remote from the Remote Desktop Protocol (RDP) server, associated with a connection between the Remote Desktop Protocol (RDP) client and a networking device directly communicating with the Remote Desktop Protocol (RDP) client; and, generate, based on the connection information, a user experience score indicative of the quality of the connection during the remote session.

19 Claims, 3 Drawing Sheets

---

300

302 — obtain connection information from a Remote Desktop Protocol (RDP) client, remote from the Remote Desktop Protocol (RDP) server, associated with a connection between said Remote Desktop Protocol (RDP) client and a networking device directly connected to said Remote Desktop Protocol (RDP) client, and, 304 — generate, based on said connection information, a user experience score indicative of the quality of said connection during the remote session

(56) References Cited

U.S. PATENT DOCUMENTS

| | | | |
|---|---|---|---|
| 2018/0115566 A1* | 4/2018 | Azvine | H04L 63/0428 |
| 2019/0089748 A1* | 3/2019 | Manor | H04W 28/0231 |
| 2020/0029240 A1* | 1/2020 | Li | H04L 43/08 |
| 2020/0287802 A1* | 9/2020 | Singh | H04L 41/5016 |
| 2020/0287993 A1 | 9/2020 | Schweizer et al. | |
| 2020/0322820 A1* | 10/2020 | Carter | H04W 24/10 |

* cited by examiner

SYSTEM AND METHOD FOR A REMOTE SESSION USER EXPERIENCE ANALYSIS

TECHNICAL FIELD

The present invention relates to the field of systems and methods for analyzing user experience during a remote session.

BACKGROUND

Remote desktop is a program or an operating system feature that allows a user to connect to a computer in another location, see that computer's desktop and interact with it as if it were local. A remote desktop connection relies upon any of a number of protocols, including Remote Desktop Protocol (RDP), virtual network computing (VNC), NX technology, Independent Computing Architecture (ICA), PCoIP, VMware Blast, and the like.

A Remote Desktop Protocol (RDP) is a proprietary protocol providing a user with a graphical interface to connect to a desktop computer located at a remote location over a network connection. For this purpose, the user's computer employs a Remote Desktop Protocol (RDP) client software, while the desktop computer employs a Remote Desktop Protocol (RDP) server software.

Current Remote Desktop Protocols (RDP) connections between RDP/RDSH/VDI servers and client computers do not collect information about client's side metrics and variables, which impact the quality of the connection between the client computer and the RDP/RDSH/VDI server, as well as, the overall user experience of the user working on the remote server.

Thus, there is a need in the art for a new system and method for analyzing a user experience during a remote session, which considers both server and client sides when measuring the overall user experience of the session.

GENERAL DESCRIPTION

In accordance with a first aspect of the presently disclosed subject matter, there is provided a Remote Desktop Protocol (RDP) server comprising a processing circuitry configured to: obtain connection information from a Remote Desktop Protocol (RDP) client, remote from the Remote Desktop Protocol (RDP) server, associated with a connection between the Remote Desktop Protocol (RDP) client and a networking device directly communicating with the Remote Desktop Protocol (RDP) client; and, generate, based on the connection information, a user experience score indicative of the quality of the connection during the remote session.

In some cases, the Remote Desktop Protocol (RDP) server obtains the connection information from the Remote Desktop Protocol (RDP) client through a virtual channel being generated between the Remote Desktop Protocol (RDP) server and the Remote Desktop Protocol (RDP) client during the remote session.

In some cases, the connection information includes information regarding latency in the connection between the Remote Desktop Protocol (RDP) client and the networking device.

In some cases, the latency is determined utilizing one or more ping commands sent from the Remote Desktop Protocol (RDP) client to the networking device.

In some cases, the connection information further includes information regarding one or more of: (a) latency between the Remote Desktop Protocol (RDP) client and a given IP address, (b) a level of Wi-Fi reception provided by the networking device, (c) a level of cellular reception provided by the networking device, (d) Wi-Fi parameters associated with the networking device providing Wi-Fi reception to the Remote Desktop Protocol (RDP) client, (e) packet loss ratio for the connection between the Remote Desktop Protocol (RDP) client and the Remote Desktop Protocol (RDP) server, (f) packet loss ratio for a network connection on the Remote Desktop Protocol (RDP), (g) indication on whether the Wi-Fi connection used by the Remote Desktop Protocol (RDP) client to connect to the Remote Desktop Protocol (RDP) server is a secured connection and which security policy it uses, (h) a connection type of the connection between the Remote Desktop Protocol (RDP) client and the Remote Desktop Protocol (RDP) server, (i) user's location, (j) ISP name, (k) client performance metrics, or (l) CPU usage of applications run on the Remote Desktop Protocol (RDP) client.

In some cases, the connection information is being analyzed to identify potential problems in the connection.

In some cases, the connection information is being analyzed such that once a potential fault in the connection is detected, a message is sent to the Remote Desktop Protocol (RDP) client asking to rate the current user experience.

In some cases, whenever the rating of the current user experience is below a predefined threshold, the RDP server provides suggestion on how to improve the user experience.

In some cases, the experience score is compared to a predefined threshold.

In some cases, the user experience score is compared to a score indicative of the quality of connection of prior remote sessions made between one or more Remote Desktop Protocol (RDP) clients and the Remote Desktop Protocol (RDP) server.

In some cases, the networking device is a router.

In some cases, the networking device has Wi-Fi capabilities.

In some cases, the connection information further includes information regarding one or more additional communication devices associated with the connection between the networking device and the Remote Desktop Protocol (RDP) server.

In accordance with a second aspect of the presently disclosed subject matter, there is provided a method for remote session user experience analysis comprising: obtaining, by a Remote Desktop Protocol (RDP) server, connection information from a Remote Desktop Protocol (RDP) client, remote from the Remote Desktop Protocol (RDP) server, associated with a connection between said Remote Desktop Protocol (RDP) client and a networking device directly communicating with said Remote Desktop Protocol (RDP) client; and, generating, by the Remote Desktop Protocol (RDP) server based on said connection information, a user experience score indicative of the quality of said connection during the remote session.

In some cases, the Remote Desktop Protocol (RDP) server obtains said connection information from the Remote Desktop Protocol (RDP) client through a virtual channel being generated between the Remote Desktop Protocol (RDP) server and the Remote Desktop Protocol (RDP) client during the remote session.

In some cases, the connection information includes information regarding latency in the connection between the Remote Desktop Protocol (RDP) client and the networking device.

In some cases, the latency is determined utilizing one or more ping commands sent from the Remote Desktop Protocol (RDP) client to the networking device.

In some cases, the connection information further includes information regarding one or more of: (a) latency between the Remote Desktop Protocol (RDP) client and a given IP address, (b) a level of Wi-Fi reception provided by the networking device, (c) a level of cellular reception provided by the networking device, (d) Wi-Fi parameters associated with the networking device providing Wi-Fi reception to the Remote Desktop Protocol (RDP) client, (e) packet loss ratio for the connection between the Remote Desktop Protocol (RDP) client and the Remote Desktop Protocol (RDP) server, (f) packet loss ratio for a network connection on the Remote Desktop Protocol (RDP), (g) indication on whether the Wi-Fi connection used by the Remote Desktop Protocol (RDP) client to connect to the Remote Desktop Protocol (RDP) server is a secured connection and which security policy it uses, (h) a connection type of the connection between the Remote Desktop Protocol (RDP) client and the Remote Desktop Protocol (RDP) server, (i) user's location, (j) ISP name, (k) client performance metrics, or (l) CPU usage of applications run on the Remote Desktop Protocol (RDP) client.

In some cases, the connection information is being analyzed to identify potential problems in the connection.

In some cases, the connection information is being analyzed such that once a potential fault in the connection is detected, a message is sent to the Remote Desktop Protocol (RDP) client asking to rate the current user experience.

In some cases, whenever the rating of the current user experience is below a predefined threshold, the RDP server provides suggestion on how to improve the user experience.

In some cases, the user experience score is compared to a predefined threshold.

In some cases, the user experience score is compared to a score indicative of the quality of connection of prior remote sessions made between one or more Remote Desktop Protocol (RDP) clients and the Remote Desktop Protocol (RDP) server.

In some cases, the networking device is a router.

In some cases, the networking device has Wi-Fi capabilities.

In some cases, the connection information further includes information regarding one or more additional communication devices associated with the connection between the networking device and the Remote Desktop Protocol (RDP) server.

In accordance with a third aspect of the presently disclosed subject matter, there is provided a non-transitory computer readable storage medium having computer readable program code embodied therewith, the computer readable program code, executable by at least one processor to perform a method for remote session user experience analysis, the user experience analysis comprising one or more components, the method comprising: obtaining, by a Remote Desktop Protocol (RDP) server, connection information from a Remote Desktop Protocol (RDP) client, remote from the Remote Desktop Protocol (RDP) server, associated with a connection between said Remote Desktop Protocol (RDP) client and a networking device directly communicating with said Remote Desktop Protocol (RDP) client; and, generating, by the Remote Desktop Protocol (RDP) server based on said connection information, a user experience score indicative of the quality of said connection during the remote session.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
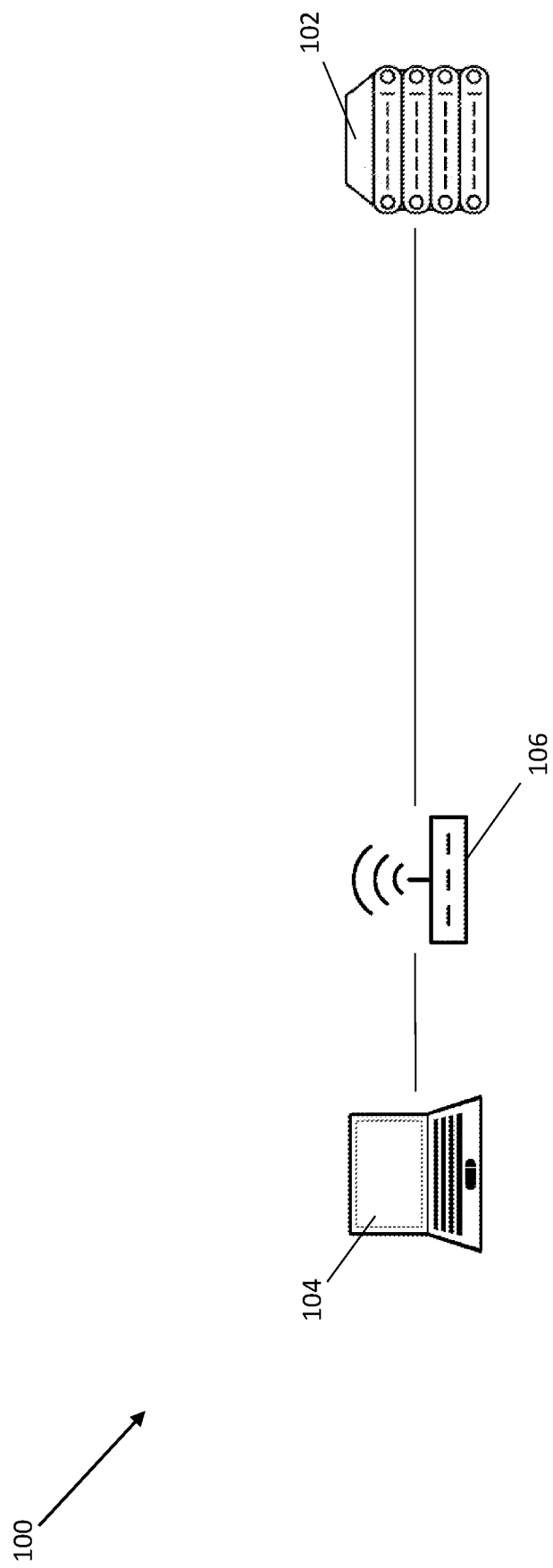
FIG. 1 is a schematic illustration of a remote session user experience analysis system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "generating", "determining", "analyzing", "suggesting", "comparing" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter.

Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
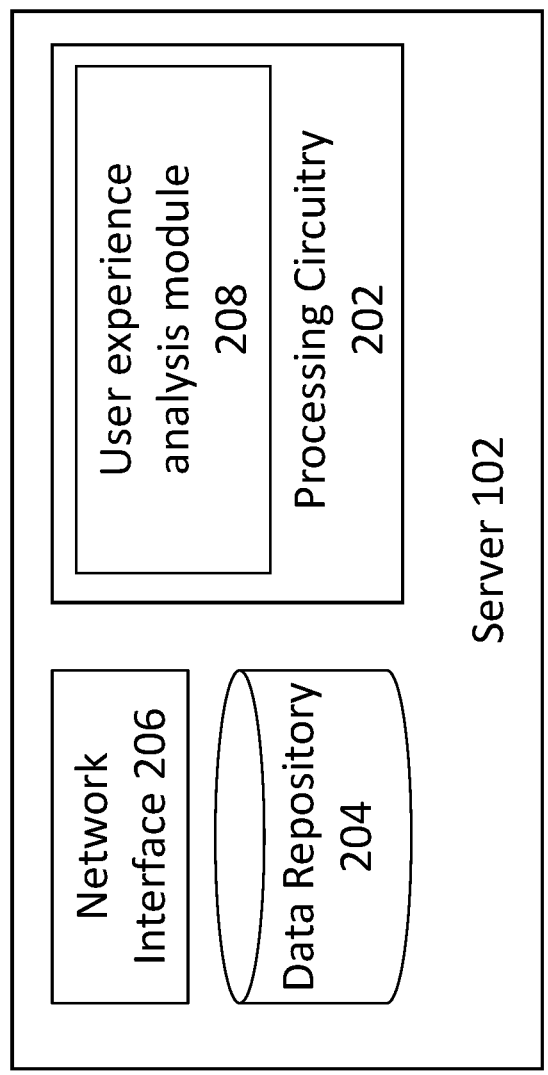
FIG. 2 is a block diagram schematically illustrating one example of a remote session user experience analysis system, in accordance with the presently disclosed subject matter; and, FIG. 3 is a flowchart illustrating one example of a sequence of operations carried out by a remote session user experience analysis system, in accordance with the presently disclosed subject matter.
Figure 3:
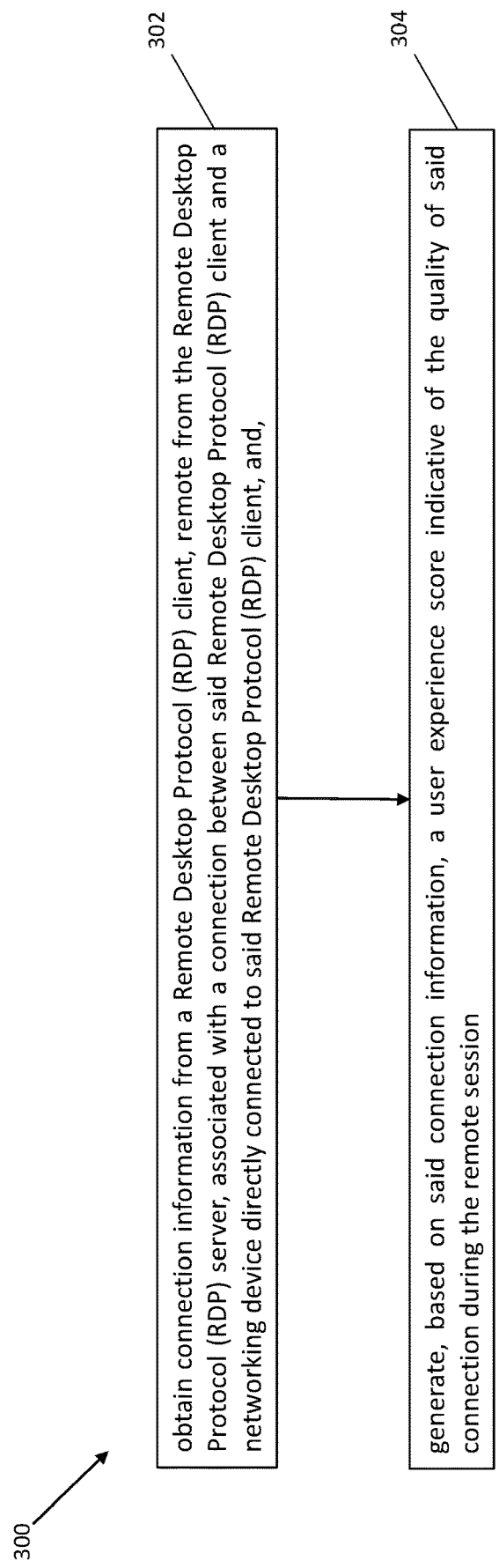

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1 and 2 illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, showing a schematic illustration of a remote session user experience analysis system (also interchangeably referred to herein as "system"), in accordance with the presently disclosed subject matter.

As shown in the schematic illustration, system 100 includes a server 102, for example, a Remote Desktop Protocol (RDP) server (running a Remote Desktop Protocol (RDP) server software), in communication with at least one client device 104, for example, a Remote Desktop Protocol (RDP) client device (running a Remote Desktop Protocol (RDP) client software), situated, e.g., at a location remote from the location of server 102 (a different building, city, state, country, continent, etc.). Client device 104, which can be any one of a laptop computer, a desktop computer, a tablet computer, and the like, communicates with server 102 through a network (e.g., internet), using a networking device 106 having wire and/or wireless communication capabilities (for example, Wi-Fi capabilities). The networking device 106 can be, for example, in direct communication with client device 104 (e.g., by being directly connected to the client device 104) and can be any one of a router, a modem, an Ethernet card, a gateway, and the like.

In some cases, the communication between client device 104 and server 102 may include one or more communication devices (e.g., servers, routers, switches, etc.) dispersed throughout the connection route between client device 104 and server 102. The one or more communication devices are directed to assist in establishing the connection between client device 104 and server 102.

By way of example, an organization employee unable to reach the organization offices and work on his work computer from his office would like to work on urgent matters awaiting his attention from the comfort of his current location (e.g., home). To do so, the employee operates his personal computer 104, for which he has the authorization to connect to the organizational network, and runs a Remote Desktop Protocol (RDP) client software installed on his personal computer 104.

The Remote Desktop Protocol (RDP) client software installed on the employee's personal computer 104 communicates with a Remote Desktop Protocol (RDP) server software installed on an organization Remote Desktop Protocol (RDP) server 102, through an internet connection provided by a router 106 directly connected to the employee's personal computer 104. Once the two software interact, a Remote Desktop Protocol (RDP) session is initiated.

During the Remote Desktop Protocol (RDP) session, the organization Remote Desktop Protocol (RDP) server 102 sends and receives information from the Remote Desktop Protocol (RDP) client software on personal computer 104, enabling personal computer 104 to present the desktop of the employee's work computer on the employee's personal computer 104 and to interact with the desktop of the employee's work computer such that the employee can attend to the urgent matters awaiting his attention in the same manner he would have if he were in his office working on his work computer.

While the Remote Desktop Protocol (RDP) session is in progress, organization Remote Desktop Protocol (RDP) server 102 receives connection information relating to the connection between the employee's personal computer 104 and the organization Remote Desktop Protocol (RDP) server 102, enabling it to evaluate and analyze the employee's experience while in the Remote Desktop Protocol (RDP) session, as further detailed herein, inter alia, with reference to FIG. 3.

Attention is now drawn to the components of server 102.

FIG. 2 is a block diagram schematically illustrating one example of the server 102, in accordance with the presently disclosed subject matter.

In accordance with the presently disclosed subject matter, server 102 can comprise a network interface 206. The network interface 206 (e.g., a network card, a Wi-Fi client, a Li-Fi client, 3G/4G client, or any other component), enables server 102 to communicate over a network with external systems and handles inbound and outbound communications from such systems. For example, server 102 can receive, through network interface 206, connection information regarding a connection between a Remote Desktop Protocol (RDP) client device 104 and a networking device 106 directly connected to it.

Server 102 can further comprise or be otherwise associated with a data repository 204 (e.g., a database, a storage system, a memory including Read Only Memory— ROM, Random Access Memory— RAM, or any other type of memory, etc.) configured to store data, optionally including, (a) latency in the connection between the Remote Desktop Protocol (RDP) client 104 and the networking device 106, (b) latency between the Remote Desktop Protocol (RDP) client 104 and a given IP address, (c) a level of Wi-Fi reception provided by the networking device 106, (d) a level of cellular reception provided by the networking device 106, if any, (e) Wi-Fi parameters associated with the networking device providing Wi-Fi reception to the Remote Desktop Protocol (RDP) client 104, (f) packet loss ratio for the connection between the Remote Desktop Protocol (RDP) client 104 and the Remote Desktop Protocol (RDP) server 102, (g) packet loss ratio for a network connection on the Remote Desktop Protocol (RDP) client 104, (h) indication on whether the Wi-Fi connection used by the Remote Desktop Protocol (RDP) client 104 to connect to the Remote Desktop Protocol (RDP) server 102 is a secured connection and which security policy it uses, (i) a connection type of the connection between the Remote Desktop Protocol (RDP) client 104 and the Remote Desktop Protocol (RDP) server 102, (j) user's location, (k) Internet service provider (ISP) name, (l) client performance metrics, (m) CPU usage of applications run on the Remote Desktop Protocol (RDP) client 104, etc. Data repository 204 can be further configured to enable retrieval and/or update and/or deletion of the stored data. It is to be noted that in some cases, data repository 204 can be distributed, while the server 102 has access to the information stored thereon, e.g., via a wired or wireless network to which server 102 is able to connect (utilizing its network interface 206).

Server 102 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant server 102 resources and for enabling operations related to server's 102 resources.

The processing circuitry 202 comprises a user experience analysis module 208, configured to perform analysis process, as further detailed herein, inter alia with reference to FIG. 3.

Turning to FIG. 3 there is shown a flowchart illustrating one example of a sequence of operations carried out for remote session user experience analysis system, in accordance with the presently disclosed subject matter.

Accordingly, the remote session user experience analysis system can be configured to perform a user experience analysis process 300, e.g., using user experience analysis module 208.

For this purpose, during a Remote Desktop Protocol (RDP) session, Remote Desktop Protocol (RDP) server 102 obtains connection information from Remote Desktop Protocol (RDP) client device 104 associated with a connection between the Remote Desktop Protocol (RDP) client device 104 and the networking device 106 directly communicating with the Remote Desktop Protocol (RDP) client device 104 (block 302). The Remote Desktop Protocol (RDP) server 102 can receive the connection information through, for example, a virtual channel being generated between the Remote Desktop Protocol (RDP) server 102 and the Remote Desktop Protocol (RDP) client device 104, during the Remote Desktop Protocol (RDP) session.

The connection information may include, for example, information regarding latency in the connection between the Remote Desktop Protocol (RDP) client device 104 and the networking device 106, which can be determined, for example, by utilizing one or more ping commands sent from Remote Desktop Protocol (RDP) client device 104 to networking device 106.

In addition, the connection information may include information regarding one or more of: (a) latency between the Remote Desktop Protocol (RDP) client device 104 and a given IP address, (b) a level of Wi-Fi reception provided by the networking device 106, (c) a level of cellular reception provided by the networking device 106, (d) Wi-Fi parameters associated with the networking device 106 providing Wi-Fi reception to the Remote Desktop Protocol (RDP) client device 104, (e) packet loss ratio for the connection between the Remote Desktop Protocol (RDP) client device 104 and the Remote Desktop Protocol (RDP) server 102, (f) packet loss ratio for a network connection on the Remote Desktop Protocol (RDP), (g) indication on whether the Wi-Fi connection used by the Remote Desktop Protocol (RDP) client device 104 to connect to the Remote Desktop Protocol (RDP) server 102 is a secured connection and which security policy it uses, (h) a connection type of the connection between the Remote Desktop Protocol (RDP) client device 104 and the Remote Desktop Protocol (RDP) server 102, (i) user's location, (j) ISP name, (k) client performance metrics, or (l) CPU usage of applications run on the Remote Desktop Protocol (RDP) client device 104.

In some cases, the connection information further includes information regarding one or more communication devices (e.g., servers, routers, switches, etc.) dispersed throughout the connection route between client device 104 and server 102, assisting in forming the connection between the two. The connection information can include, for example, information regarding the status of the one or more communication devices, the quality of connection to the one or more communication devices, specific problems in the one or more communication devices, and the like.

Once the connection information reaches Remote Desktop Protocol (RDP) server 102, Remote Desktop Protocol (RDP) server 102 generates a user experience score indicative of the quality of the connection between the Remote Desktop Protocol (RDP) client device 104 and the networking device 106, during the Remote Desktop Protocol (RDP) session (block 304). The user experience score may be compared, for example, to a predefined threshold or a score indicative of the quality of connection of prior remote sessions made between one or more Remote Desktop Protocol (RDP) clients and the Remote Desktop Protocol (RDP) server 102. The results of this comparison may then be presented, for example, to the user of Remote Desktop Protocol (RDP) client device 104, or to an Information Technology (IT)/Network administrator.

By way of example, in accordance with the example described above relating to FIG. 1, during the Remote Desktop Protocol (RDP) session between the employee's personal computer 104 and the organization Remote Desktop Protocol (RDP) server 102, the employee is experiencing a delay in his personal computer's 104 operations.

In conformity with the delay in operations the employee is experiencing, information indicating of latency in the connection between the employee's personal computer 104 and his home network router 106 is transferred from the employee's personal computer 104 to the organization Remote Desktop Protocol (RDP) server 102 through a virtual channel created between them.

The organization Remote Desktop Protocol (RDP) server 102 analyzes the information received from the employee's personal computer 104 and generates a user experience score of 7 out of 10, based on it.

The organization Remote Desktop Protocol (RDP) server 102 then compares the generated experience score (7 out of 10) to a predefined threshold (8). Since the generated experience score of the current operation of the employee's personal computer 104 is below the predefined threshold (7 vs. 8), the organization Remote Desktop Protocol (RDP) server 102 notifies the organization IT manager of a latency problem associated with the connection between the employee's personal computer 104 and his home network router 106.

In some cases, the Remote Desktop Protocol (RDP) server 102 analyzes the connection information obtained so as to identify potential problems associated with the connection between the Remote Desktop Protocol (RDP) client device 104 and the networking device 106. The analysis can then be presented for example, to the user of Remote Desktop Protocol (RDP) client device 104, or to an Information Technology (IT)/Network administrator through, e.g., a user interface (UI). Turning to the example above, once Remote Desktop Protocol (RDP) server 102 obtains the information indicating of latency in the connection between the employee's personal computer 104 and his home network router 106, it analyzes the information and generates a potential problems report, which is then presented to the organization Information Technology (IT) manager via a designated message window.

In other cases, alternatively or additionally to the above, Remote Desktop Protocol (RDP) server 102 analyzes the connection information such that once a potential fault is detected, a message is sent to the Remote Desktop Protocol (RDP) client device 104 asking its user to rate his current user experience. The current user experience is then compared to a predefined threshold, and whenever the rating of the current user experience is below the predefined threshold, the Remote Desktop Protocol (RDP) server 102 provides one or more suggestions as to how to improve the current user experience. The one or more suggestions may be predefined or a result of a real time analysis made by the Remote Desktop Protocol (RDP) server 102. Turning to the example above, as Remote Desktop Protocol (RDP) server 102 obtains (through the virtual channel assembled) information indicating of latency in the connection between the employee's personal computer 104 and his home network router 106, it sends the employee's personal computer 104 a message, presented to the employee in a pop-up message window, to rate his current experience from 1 to 10. In response to the message, and in light of the delay in operations the employee is experiencing, the employee rates his current experience as 6. The employee's current experience score (6) is then compared to a predefined threshold (9). Since the employee's current experience score is below the predefined threshold (6 vs. 9), the organization Remote Desktop Protocol (RDP) server 102 sends the employee's personal computer 104 a list of predefined suggestions aimed at solving or improving the latency issue.

It is to be noted, with reference to FIG. 3, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What is claimed is:

1. A Remote Desktop Protocol (RDP) server comprising a processing circuitry configured to:
    obtain, while a Remote Desktop Protocol (RDP) session is in progress, connection information from a Remote Desktop Protocol (RDP) client, remote from the Remote Desktop Protocol (RDP) server, wherein (i) the obtained connection information is associated with a connection between said Remote Desktop Protocol (RDP) client and a networking device directly communicating with said Remote Desktop Protocol (RDP) client, and (ii) the obtained connection information includes information regarding Wi-Fi parameters associated with the networking device providing Wi-Fi reception to the Remote Desktop Protocol (RDP) client; and
    generate, based on real time analysis of said connection information, a user experience score indicative of the quality of said connection during said Remote Desktop Protocol (RDP) session.

2. The RDP server of claim 1, wherein the Remote Desktop Protocol (RDP) server obtains said connection information from the Remote Desktop Protocol (RDP) client through a virtual channel being generated between the Remote Desktop Protocol (RDP) server and the Remote Desktop Protocol (RDP) client during said Remote Desktop Protocol (RDP) session.

3. The RDP server of claim 1, wherein the obtained connection information further includes information regarding latency in the connection between the Remote Desktop Protocol (RDP) client and the networking device.

4. The RDP server of claim 3, wherein the latency is determined utilizing one or more ping commands sent from the Remote Desktop Protocol (RDP) client to the networking device.

5. The RDP server of claim 1, wherein the obtained connection information is being analyzed to identify potential problems in the connection.

6. The RDP server of claim 1, wherein the obtained connection information is being analyzed such that once a potential fault in the connection is detected, a message is sent to the Remote Desktop Protocol (RDP) client asking to rate the current user experience.

7. The RDP server of claim 6, wherein whenever the rating of the current user experience is below a predefined threshold, the RDP server provides suggestion on how to improve the user experience.

8. The RDP server of claim 1, wherein the user experience score is compared to a predefined threshold.

9. The RDP server of claim 1, wherein the user experience score is compared to a score indicative of the quality of connection of prior Remote Desktop Protocol (RDP) sessions made between one or more Remote Desktop Protocol (RDP) clients and the Remote Desktop Protocol (RDP) server.

10. A method for remote session user experience analysis comprising:
    obtaining, by a Remote Desktop Protocol (RDP) server, while a Remote Desktop Protocol (RDP) session is in progress, connection information from a Remote Desktop Protocol (RDP) client, remote from the Remote Desktop Protocol (RDP) server, wherein (i) the obtained connection information is associated with a connection between said Remote Desktop Protocol (RDP) client and a networking device directly communicating with said Remote Desktop Protocol (RDP) client, and (ii) the obtained connection information includes information regarding Wi-Fi parameters associated with the networking device providing Wi-Fi reception to the Remote Desktop Protocol (RDP) client; and,
    generating, by the Remote Desktop Protocol (RDP) server based on real time analysis of said connection information, a user experience score indicative of the quality of said connection during said Remote Desktop Protocol (RDP) session.

11. The method of claim 10, wherein the Remote Desktop Protocol (RDP) server obtains said connection information from the Remote Desktop Protocol (RDP) client through a virtual channel being generated between the Remote Desktop Protocol (RDP) server and the Remote Desktop Protocol (RDP) client during said Remote Desktop Protocol (RDP) session.

12. The method of claim 10, wherein the obtained connection information further includes information regarding latency in the connection between the Remote Desktop Protocol (RDP) client and the networking device.

13. The method of claim 10, wherein the user experience score is compared to a predefined threshold.

14. The method of claim 10, wherein the user experience score is compared to a score indicative of the quality of connection of prior Remote Desktop Protocol (RDP) sessions made between one or more Remote Desktop Protocol (RDP) clients and the Remote Desktop Protocol (RDP) server.

15. A non-transitory computer readable storage medium having computer readable program code embodied therewith, the computer readable program code, executable by at least one processor to perform a method for remote session user experience analysis, the user experience analysis comprising one or more components, the method comprising:
    obtaining, by a Remote Desktop Protocol (RDP) server, while a Remote Desktop Protocol (RDP) session is in progress, connection information from a Remote Desktop Protocol (RDP) client, remote from the Remote Desktop Protocol (RDP) server, wherein (i) the obtained connection information is associated with a connection between said Remote Desktop Protocol (RDP) client and a networking device directly communicating with said Remote Desktop Protocol (RDP) client, and (ii) the obtained connection information includes information regarding Wi-Fi parameters associated with the networking device providing Wi-Fi reception to the Remote Desktop Protocol (RDP) client; and,
    generating, by the Remote Desktop Protocol (RDP) server based on real time analysis of said connection information, a user experience score indicative of the quality of said connection during said Remote Desktop Protocol (RDP) session.

16. The method of claim 12, wherein the latency is determined utilizing one or more ping commands sent from the Remote Desktop Protocol (RDP) client to the networking device.

17. The method of claim 10, wherein the obtained connection information is being analyzed to identify potential problems in the connection.

18. The method of claim 10, wherein the obtained connection information is being analyzed such that once a potential fault in the connection is detected, a message is sent to the Remote Desktop Protocol (RDP) client asking to rate the current user experience.

19. The method of claim 18, wherein whenever the rating of the current user experience is below a predefined threshold, the RDP server provides suggestion on how to improve the user experience.

\* \* \* \* \*